(12) United States Patent
Marui

(10) Patent No.: US 11,498,368 B2
(45) Date of Patent: Nov. 15, 2022

(54) TIRE WITH ENHANCED TREAD

(71) Applicant: Shinji Marui, Kobe (JP)

(72) Inventor: Shinji Marui, Kobe (JP)

( * ) Notice: Subject to any disclaimer, the term of this patent is extended or adjusted under 35 U.S.C. 154(b) by 622 days.

(21) Appl. No.: 15/796,562

(22) Filed: Oct. 27, 2017

(65) Prior Publication Data

US 2019/0126689 A1 May 2, 2019

(51) Int. Cl.
*B60C 11/11* (2006.01)
*B60C 11/13* (2006.01)
*B60C 11/03* (2006.01)

(52) U.S. Cl.
CPC .............. *B60C 11/11* (2013.01); *B60C 11/033* (2013.01); *B60C 11/1315* (2013.01); *B60C 11/1376* (2013.01); *B60C 11/1384* (2013.01); B60C 2011/0341 (2013.01); B60C 2011/133 (2013.01); B60C 2011/1338 (2013.01); B60C 2200/10 (2013.01); B60C 2200/12 (2013.01)

(58) Field of Classification Search
CPC ..... B60C 11/11; B60C 11/033; B60C 11/1376
See application file for complete search history.

(56) References Cited

U.S. PATENT DOCUMENTS

| 4,311,179 A * | 1/1982 | Hayakawa | B60C 11/11 |
| | | | 152/209.11 |
| 5,343,918 A * | 9/1994 | Fontaine | B60C 11/0306 |
| | | | 152/209.5 |
| 2005/0211353 A1 * | 9/2005 | Bogenschuetz | B60C 11/1315 |
| | | | 152/209.1 |
| 2013/0000805 A1 * | 1/2013 | Oodaira | B60C 11/11 |
| | | | 152/209.18 |
| 2016/0236516 A1 * | 8/2016 | Sueishi | B60C 11/11 |

FOREIGN PATENT DOCUMENTS

| FR | 819836 A | * | 10/1937 |
| JP | 62-289402 A | * | 12/1987 |
| JP | 03-139402 A | * | 6/1991 |
| JP | 07-329517 A | * | 12/1995 |

OTHER PUBLICATIONS

Machine translation for Japan 62-289402 (Year: 2019).*
Colorado Cyclist, pp. 42-43, Fall 1994 (Year: 1994).*
Enlargement of tire 21 (Spike-F Comp) (Year: 2019).*
Machine translation for Japan 03-139402 (Year: 2020).*
Machine translation for France 819836 (Year: 2020).*
Machine translation for Japan 07-329517 (Year: 2022).*

* cited by examiner

*Primary Examiner* — Steven D Maki
(74) *Attorney, Agent, or Firm* — Innovation Capital Law Group, LLP; Vic Lin

(57) ABSTRACT

A tire includes medial knobs and lateral knobs in right and left zones extending around the circumference. The tire includes a central zone in between two arrays of medial knobs. The central zone may include no knobs or knobs with a height less than 50% of the height of the lateral knobs.

26 Claims, 10 Drawing Sheets

TIRE WITH ENHANCED TREAD

BACKGROUND OF THE INVENTION

1. Field of the Invention

The invention relates generally to tires for bicycles and vehicles.

2. Description of Prior Art and Related Information

A need exists for tire treads to achieve an enhanced grip on the road when leaning into a turn. Conventional treads typically contain several centrally located knobs without sufficient central gaps. Such central knobs impede traction when a rider leans into a turn.

BRIEF SUMMARY OF THE INVENTION

In accordance with the present invention, structures and associated methods are disclosed which address these needs and overcome the deficiencies of the prior art.

In one aspect, a tire is provided having a circumference and a tire width. The tire comprises a left side, a right side and a central zone evenly located in between the left side and the right side. A first array of medial knobs is disposed in between the central zone and the left side. A second array of medial knobs is disposed in between the central zone and the right side. The central zone comprises a central gap that extends substantially around the circumference.

The central zone has a central zone width that is between 15% to 65% of the tire width. The central gap has a central gap width that may preferably be between 10% to 65% of the tire width, and in the range of 9 mm to 30 mm. The central gap is preferably devoid of any knob contact surfaces.

A first plurality of medial knobs in the first array comprises a first plurality of medial edges that connect a first plurality of medially facing surfaces to a first plurality of contact surfaces. A second plurality of medial knobs in the second array comprises a second plurality of medial edges that connect a second plurality of medially facing surfaces to a second plurality of contact surfaces. The central gap width between the first plurality of medial edges and the second plurality of medial edges may preferably be at least 10% of the tire width, and in the range of 9 mm to 30 mm.

The first array of medial knobs and the second array of medial knobs comprise a medial knob height that is at least 3% of the tire width. The tire further comprises a first array of lateral-most knobs in between the first array of medial knobs and the left side; and a second array of lateral-most knobs in between the second array of medial knobs and the right side. The first array of lateral-most knobs and the second array of lateral-most knobs comprise a lateral-most knob height. The first array of medial knobs and the second array of medial knobs comprise a medial knob height that is at least 20% of the lateral-most knob height.

The tire further comprises a first lateral gap between the first array of medial knobs and the first array of lateral-most knobs. The first lateral gap has a first lateral gap width. A second lateral gap is preferably formed between the second array of medial knobs and the second array of lateral-most knobs. The second lateral gap has a second lateral gap width. The central gap has a central gap width that is preferably greater than the first lateral gap width and the second lateral gap width.

The first array of medial knobs comprises a first plurality of contact surfaces, wherein sections of the first plurality of contact surfaces may be disposed in the central zone. The second array of medial knobs comprises a second plurality of contact surfaces, wherein sections of the second plurality of contact surfaces may be disposed in the central zone. The sections of the first plurality of contact surfaces and the sections of the second plurality of contact surfaces amount to less than 20% of a total surface area of the central zone.

The first array of medial knobs comprises a first plurality of contact surfaces. The first plurality of contact surfaces defines a first aggregate length that is at least 25% of the circumference. The second array of medial knobs comprises a second plurality of contact surfaces. The second plurality of contact surfaces defines a second aggregate length that is at least 25% of the circumference.

In another aspect, a tire is provided having a circumference, a tire width, a left zone comprising a first array of medial knobs, a right zone comprising a second array of medial knobs, and a central zone centrally located between the left zone and the right zone. The central zone has a central zone width in the range of 15% to 65% of the tire width. The central zone comprises a central gap extending substantially around the circumference. The central gap preferably lacks any knob contact surfaces.

The central gap has a central gap width between 10% to 65% of the tire width and preferably in the range of 9 mm to 30 mm. A first plurality of medial knobs in the first array comprises a first plurality of medial edges that connect a first plurality of medially facing surfaces to a first plurality of contact surfaces. A second plurality of medial knobs in the second array comprises a second plurality of medial edges that connect a second plurality of medially facing surfaces to a second plurality of contact surfaces. The central gap width between the first plurality of medial edges and the second plurality of medial edges is at least 10% of the tire width, and preferably in the range of 9 mm to 30 mm.

The first array of medial knobs and the second array of medial knobs comprise a medial knob height that is at least 3% of the tire width. The tire further comprises a first array of lateral-most knobs in between the first array of medial knobs and the left side, and a second array of lateral-most knobs in between the second array of medial knobs and the right side. The first array of lateral-most knobs and the second array of lateral-most knobs comprise a lateral-most knob height.

The first array of medial knobs and the second array of medial knobs comprise a medial knob height that is at least 20% of the lateral-most knob height.

The tire further comprises a first lateral gap between the first array of medial knobs and the first array of lateral-most knobs, and a second lateral gap between the second array of medial knobs and the second array of lateral-most knobs, the second lateral gap having a second lateral gap width. The first lateral gap has a first lateral gap width. The central gap has a central gap width that is greater than the first lateral gap width and the second lateral gap width.

The first array of medial knobs comprises a first array of medial edges. The second array of medial knobs comprises a second array of medial edges. The central gap lies between first array of medial edges and the second array of medial edges.

The first array of medial knobs comprises a first plurality of contact surfaces, wherein sections of the first plurality of contact surfaces may be disposed in the central zone. The second array of medial knobs comprises a second plurality of contact surfaces, wherein sections of the second plurality of contact surfaces may be disposed in the central zone. The sections of the first plurality of contact surfaces and the sections of the second plurality of contact surfaces amount to less than 20% of a total surface area of the central zone.

The first array of medial knobs comprises a first plurality of contact surfaces. The first plurality of contact surfaces defines a first aggregate length that is at least 25% of the circumference. The second array of medial knobs comprises a second plurality of contact surfaces. The second plurality of contact surfaces defines a second aggregate length that is at least 25% of the circumference.

In a further aspect, a tire is provided having a circumference, a tire width, a left zone, a right zone and a central zone. The left zone comprises a first array of medial knobs. The first array of medial knobs comprises a first plurality of medial edges. The right zone comprises a second array of medial knobs. The second array of medial knobs comprises a second plurality of medial edges. The central zone is centrally located between the left zone and the right zone. The central zone has a central zone width in the range of 15% to 65% of the tire width. The central zone has a central gap extending around the circumference of the tire without any knob contact surfaces. The central gap has a central gap width preferably between 10% to 65% of the tire width, and preferably in the range of 9 mm to 30 mm.

The first array of medial knobs and the second array of medial knobs comprise a medial knob height that is at least 3% of the tire width.

The first array of medial knobs comprises a first plurality of contact surfaces, wherein sections of the first plurality of contact surfaces may be disposed in the central zone. The second array of medial knobs comprises a second plurality of contact surfaces, wherein sections of the second plurality of contact surfaces may be disposed in the central zone. The sections of the first plurality of contact surfaces and the sections of the second plurality of contact surfaces amount to less than 20% of a total surface area of the central zone.

The first array of medial knobs comprises a first plurality of contact surfaces. The first plurality of contact surfaces defines a first aggregate length that is at least 25% of the circumference. The second array of medial knobs comprises a second plurality of contact surfaces. The second plurality of contact surfaces defines a second aggregate length that is at least 25% of the circumference.

In a further aspect, a tire includes medial knobs and lateral knobs in right and left zones extending around the circumference. The tire includes a central zone in between two arrays of medial knobs. The central zone may include no knobs or knobs with a height less than 50% of the height of the lateral knobs.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS

Figure 1:
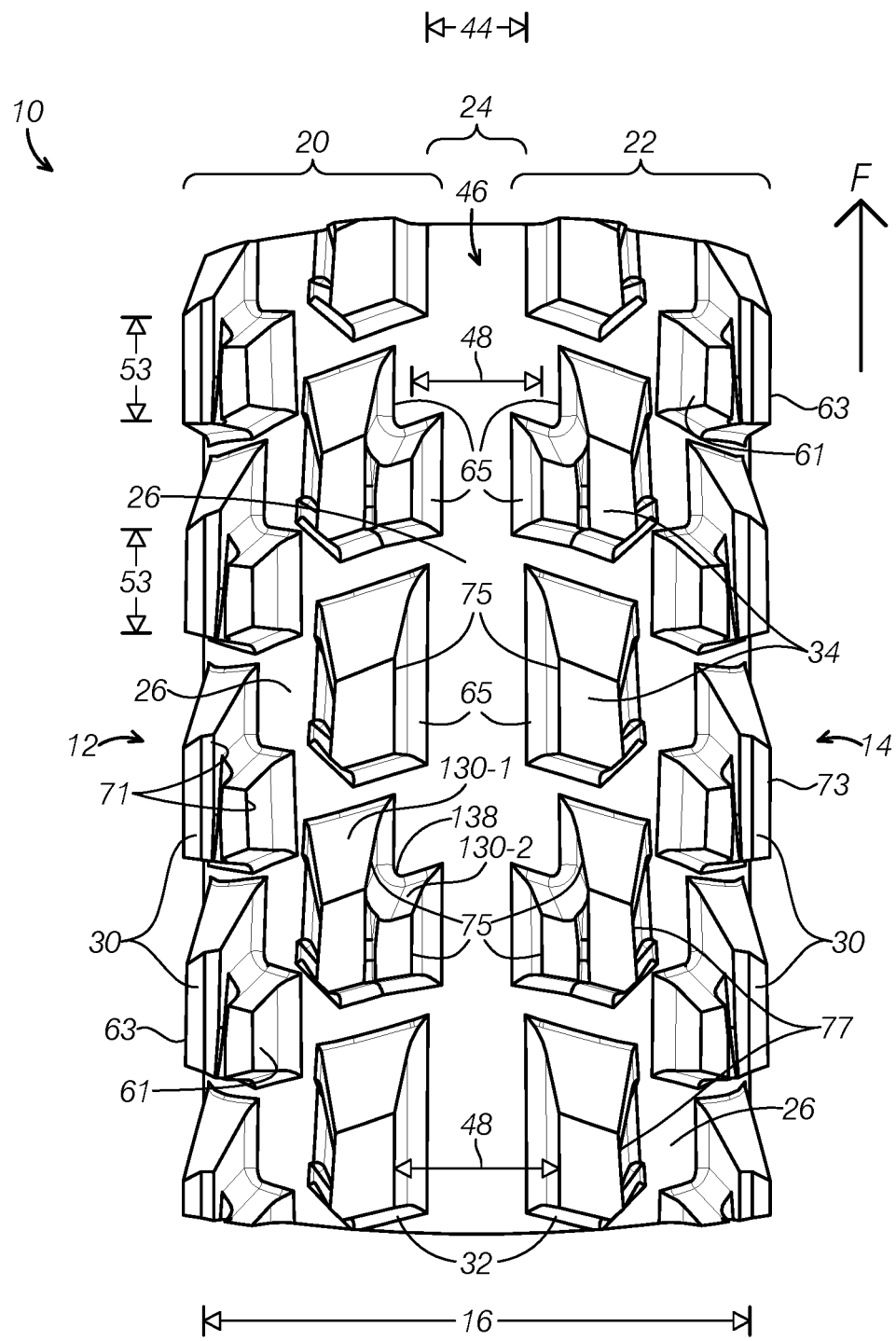
FIG. 1 is a top plan view of a section of a first preferred embodiment of the tire.

A first preferred embodiment of a tire apparatus, or simply tire, is illustrated in FIG. 1 and designated generally by the reference numeral 10. The tire may be configured for use with bicycles, scooters, motorcycles, automobiles, trucks, tractors and any other ground vehicle or toy requiring tires. The preferred treads described below may be particularly useful for mountain bike tires.

Throughout the specification, the following terms may be understood as follows:

"front," "forward" or "ahead" refers to a location or direction of a portion of the tire 10 which, when rolling forward, would come into contact with the ground relatively sooner than an adjacent rearward portion of the tire 10;

"left" and "right" refer to the perspective of a rider;

"axis," "length" or "longitudinal" refer to the direction to which the tire points and rolls;

an "array" or "row" of knobs refers to a generally linear arrangement of knobs extending axially around the circumference of the tire;

"latitudinal" or "transverse" refer to a direction perpendicular to the axis or length;

"zone" refers to a left, right or central portion of the tire that extends around the tire's circumference.

Figure 2:
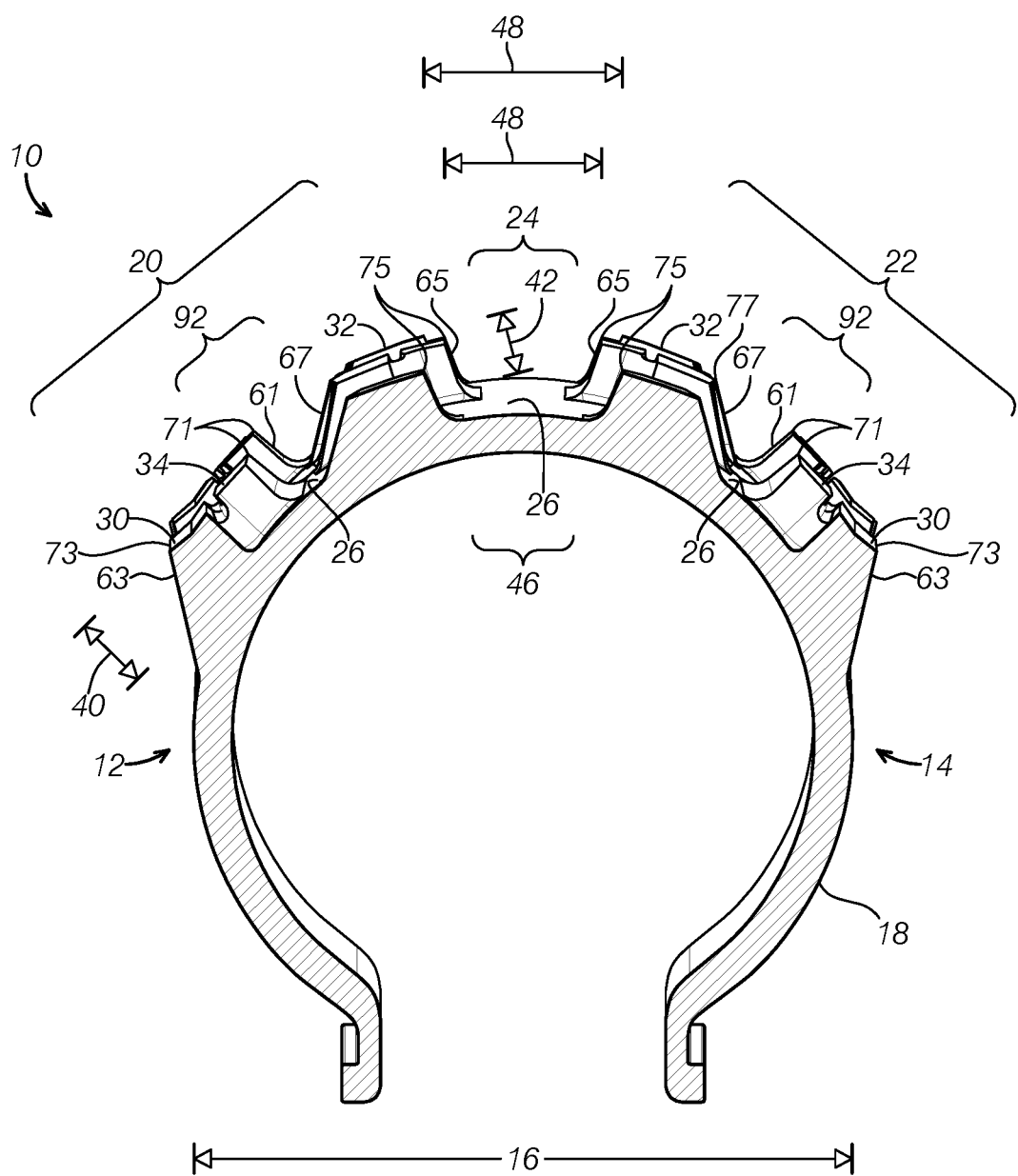
FIG. 2 is a cross-sectional view of a section of the first preferred embodiment of the tire.

In FIGS. 1 and 2, the tire 10 comprises a left side 12, a right side 14 and a tire width 16 that spans from the left side 12 to the right side 14 of a casing 18 as shown more prominently in FIG. 2. The tire 10 rolls in a forward direction "F". As an example and not by way of limitation, the tire width 16 may range from 15 mm to 130 mm. As an example and not by way of limitation, the tire circumference may range from 80 mm to 900 mm.

The tire 10 generally comprises three zones that extend around the circumference of tire 10 and are configured to engage the ground surface:

1) a left circumferential zone, or simply left zone, 20 adjacent to the left side 12;
2) a right circumferential zone, or simply right zone, 22 adjacent to the right side 14; and
3) a central circumferential zone, or simply central zone, 24 evenly centered in between the left zone 20 and right zone 22.

In the preferred embodiment, the left zone 20 and the right zone 22 each comprise at least one longitudinal array of knobs while the central zone 24 may or may not include knobs. Each side zone 20, 22 preferably comprises two longitudinal arrays of knobs, namely, an array of lateralmost knobs 30 and an array of medial, or intermediate, knobs 32. In between all the knobs 30, 32 lies a generally untreaded base surface 26 of the three zones 20, 22, 24. This base surface 26 forms the floor for determining the height of the knobs 30, 32.

In FIG. 1, the left zone 20 preferably comprises a first array of lateral-most knobs 30 and a first array of medial knobs 32. The right zone 22 comprises a second array of lateral-most knobs 30 and a second array of medial knobs 32. While the knobs 30, 32 may comprise a variety of configurations and structures, each knob 30, 32 has a generally planar contact surface 34 configured to engage the ground, as described more fully below. The contact surface 34 of each knob is the radially outermost surface of the knob which is preferably planar. The height of the knob is thus defined as the distance from the bottom portion of the knob that meets the non-treaded base 26 to the contact surface 34. In particular, the knob height may be measured from the non-treaded base 26 to the inside edge 71, 75 of the knob contact surfaces 34.

In FIG. 2, the lateral-most knobs 30 have a height 40 preferably in the range of 2 mm to 15 mm. The height 40 of the lateral-most knobs 30 may also preferably be in the range of 5% to 30% of the tire width 16. The medial knobs 32 have a height 42 that is preferably at least 20% of the lateral-most height 40 and preferably at least 3% of the tire width 16. The medial knob height 42 may preferably in the range of 1.5 mm to 8 mm.

The central zone 24 preferably has no knobs with a height greater than 50% of the lateral-most knob height 40. More preferably, not a single knob in its entirety is located in this central zone 24 throughout the circumference of the tire 10. Even more preferably, no portion of a knob is located in the central zone 24.

The central zone 24 has a central zone width 44 that is generally between 15% to 65% of the tire width 16, and more preferably between 15% to 30% of the tire width 16. As an example and not by way of limitation, the central zone width 44 may preferably be in the range of 9 mm to 20 mm.

Figure 3:
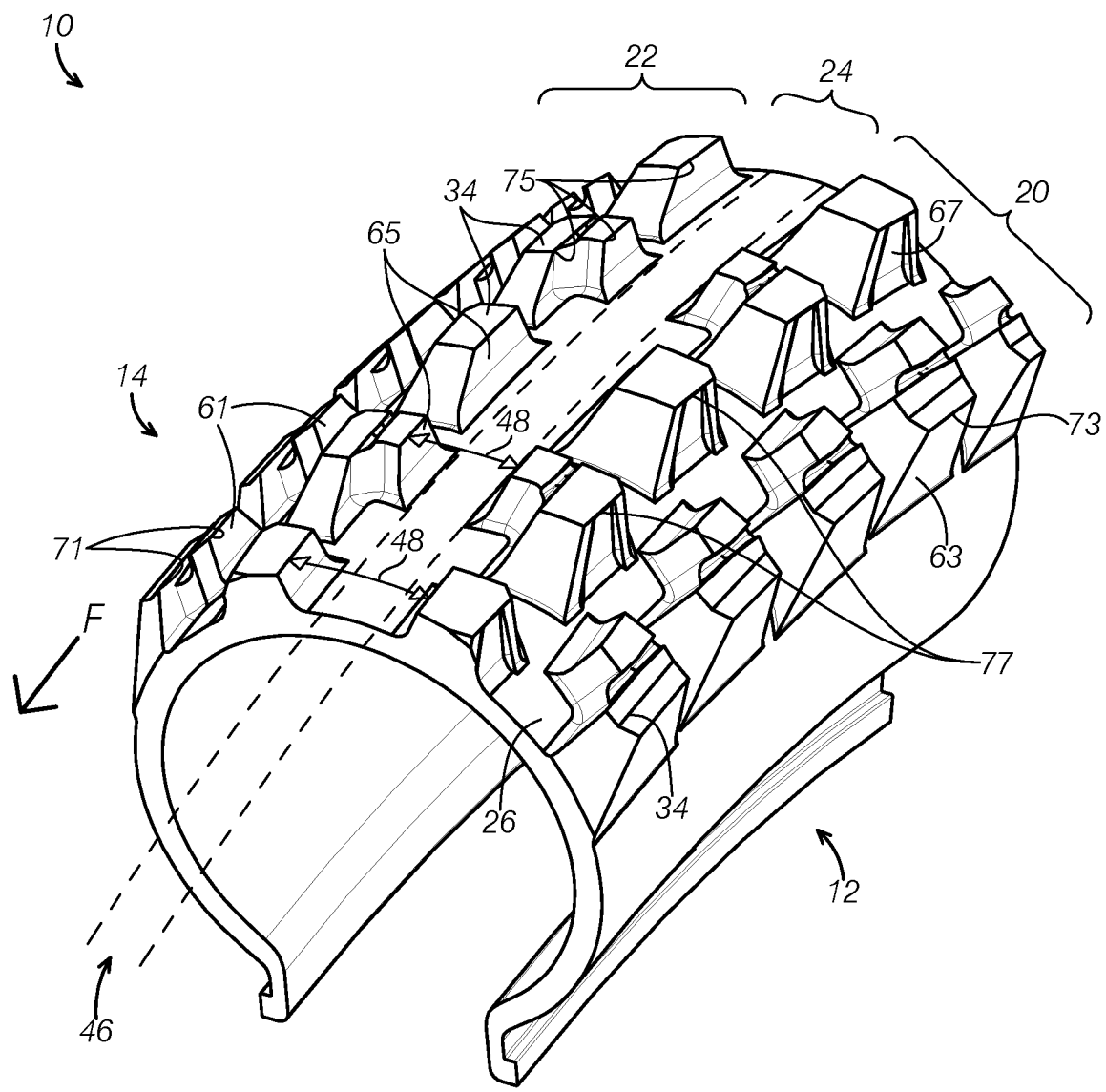
FIG. 3 is a cutaway top perspective view of a section of the first preferred embodiment of the tire.

In FIG. 3, the central zone 44 preferably comprises a central gap 46 located between the contact surfaces 34 of transversely adjacent medial knobs 32. The central gap 46 omits knob contact surfaces 34 along the central zone 24. The central gap 46 is preferably knob-free and formed with a gap width 48 measured across transversely adjacent contact surfaces 34 of medial knobs 32 disposed on opposite sides of the gap 46, namely, in the left zone 20 and right zone 22. The gap 46 may extend around 50% to 100% of the circumference of the tire 10. In an alternative embodiment where relatively fewer central knobs are intermittently disposed in the central zone 24, the central gap 46 would extend around the majority of the circumference of the tire 10 with the exception of any such centrally disposed knobs.

Preferably, no knobs or only sections of shorter knobs are located within the central zone 24. Thus, the central zone 24 may appear as a middle strip of substantially recessed or tread-free rubber extending around the circumference of the tire 10. In an alternative embodiment, the central zone 24 may comprise knobs disposed therein so long as such centrally located knobs have a height that is preferably less than 50% of the height 40 of the lateral-most knobs 30. Forming the central zone 24 with a wide enough gap between two arrays of medial knobs 32 facilitates the gripping action of the inside edges of such medial knobs 32 upon the ground when a rider leans into a turn, as described more fully below.

It will be appreciated that the central gap width 48 will be determined by the proximity of transversely adjacent medial knobs 32 on opposite sides of the gap 46, namely, the shortest distance between the contact surface 34 of a medial knob 32 in the left zone 20 and the contact surface 34 of a transversely adjacent medial knob 32 in the right zone 22. Said shortest distance between the respective contact surfaces 34 of transversely adjacent medial knobs 32 will preferably be measured by the transverse distance between the medial edges, or inside edges, 75 of said knobs 32, which are discussed more fully below. The farther the contact surfaces 34 of medial knobs 32 are transversely spaced apart from each other in the left and right zones 20, 22, the greater the gap width 48. The greater the gap width 48, the greater the opportunity for inside edges 75 of medial knobs 32 to carve into the ground when the rider leans into a turn. In the preferred embodiment, the gap width 48 is preferably 10% to 65% of the tire width 16, and preferably in the range of 9 mm to 30 mm. As an example and not by way of limitation, the gap width 48 may be in the range of 6 mm to 30 mm.

In FIGS. 1-3, each knob 30, 32 preferably has a pair of medially facing and laterally facing surfaces that radiate outwardly from the untreaded base 26 of the tire 10 and terminate at the contact surface 34. In particular, each lateral-most knob 30 preferably has a medially facing surface, or inside wall surface, 61 and a laterally facing surface, or outside wall surface, or 63. Each lateral-most knob 30 comprises a medial edge, or inside edge, 71 where the medially facing surface 61 meets the contact surface 34. Each lateral-most knob 30 also comprises a lateral edge, or outside edge, 73 where the laterally facing surface 63 meets the contact surface 34. Accordingly, each array of lateral-most knobs 30 comprises an array of medial edges 71 that collectively form a dashed line extending around the circumference of the tire 10 near the left side 12 or right side 14.

Each medial knob 32 preferably comprises a medially facing surface, or inside wall surface, 65 and a laterally facing surface, or outside wall surface, or 67. Each medial knob 32 also comprises a lateral edge, or outside edge, 77 where the laterally facing surface 67 meets the contact surface 34. Each medial knob 32 comprises a medial edge, or inside edge, 75 where the medially facing surface 65 meets the contact surface 34. This medial edge 75 of each medial knob 32 comprises a significant factor in facilitating traction. In particular, each array of medial knobs 32 comprises an array of medial edges 75 that collectively form a dashed line extending around the circumference of the tire 10 near the central zone 24. By spreading apart two arrays of medial knobs 32 with the central gap 46, therefore, the resulting tread comprises two dashed lines of medial edges 75 transversely separated by a unique circumferential gap in the central zone 24.

The width 48 of the central gap 46, therefore, is measured by the transverse spacing between the medial edge 75 of a medial knob 32 in the left zone 20 and the medial edge 75 of a transversely adjacent medial knob 32 in the right zone 22. Therefore, the central gap width 48 can vary along the circumference of the tire 10 depending upon the transverse spacing between adjacent medial edges 75. In the preferred embodiment, all pairs of transversely adjacent medial knobs 32 are preferably not transversely contiguous, but rather divided or separated by an untreaded base surface in the central zone 24 or by, for example, grooves, multi-faceting, serration, etc. In the preferred embodiment where two arrays of medial knobs 32 are positioned in respective side zones 20, 22 and, therefore, two lines of medial edges 75 are provided, the central gap 46 will thus be defined within the boundaries of the two lines of medial edges 75.

When a rider leans into a turn, the medial knob edges generally play a more significant factor in providing traction. Therefore, it will be appreciated that the transverse spacing provided in the central zone 24 between the two arrays of medial knobs 32—i.e., the central gap 46—enables the medial edges 75 of the medial knobs 32 to grip the ground more effectively than conventional treads which contain central knobs and lack transverse spacing between such centrally knobs.

Furthermore, each array of lateral-most knobs 30 also comprises an array of medial edges 71, creating the aggregate effect of a dashed line of medial edges 71 near the left side 12 or right side 14 which grip the ground depending upon which side the riders leans into. Therefore, each side zone 20, 22 may comprise two lines of medial edges 71, 75.

Referring back to FIG. 1, each array of knobs 30, 32 defines a total aggregate contact length comprising the sum of the lengths 53 of the contact surfaces 34 of individual knobs in a particular array. In the preferred embodiment, the total aggregate of contact surface lengths 53 of each array of knobs is at least 25% of the tire circumference. In the preferred embodiment, the total surface area of contact surfaces 34 within the central zone 24 preferably does not exceed 20% of the total surface area of the central zone 24.

In addition to the central gap 46, the preferred tire 10 also comprises two lateral gaps 92, each lateral gap 92 extending circumferentially in a particular side zone 20, 22. As shown more prominently in FIG. 2, a first lateral gap 92 extends circumferentially between the array of medial knobs 32 and the array of lateral-most knobs 30 in the left zone 20. A second lateral gap 92 extends circumferentially between the array of medial knobs 30 and the array of lateral-most knobs 32 in the right zone 22. In the preferred embodiment, the lateral gap 92 may have a lateral gap width in the range of 10% to 35% of the tire width. As an example and not by way of limitation, the lateral gap width may preferably be in the range of 7 mm to 20 mm.

Therefore, at least three circumferential gaps are provided in the first preferred embodiment:
1) a central gap 46 between two arrays of medial knobs 32;
2) a first lateral gap 92 between an array of medial knobs 32 and an adjacent array of lateral-most knobs 30 in one side zone; and
3) a second lateral gap 92 between an array of medial knobs 32 and an adjacent array of lateral-most knobs 30 in other side zone.

Figure 4:
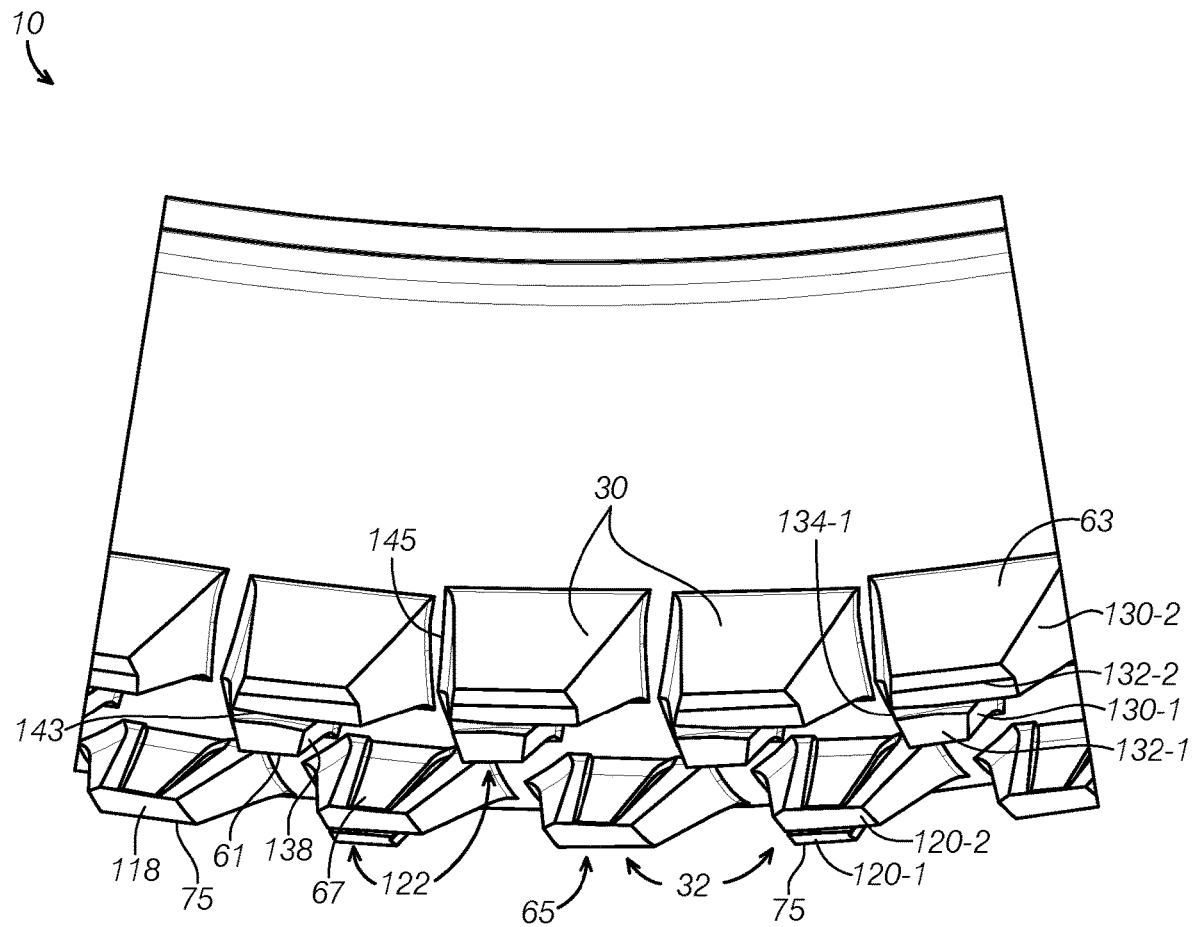
FIG. 4 is a right elevation view of a section of the first preferred embodiment of the tire.

The following description elaborates on the structures of individual knobs and knob sets formed on the preferred tires as shown more clearly in FIG. 4.

In the preferred embodiment, each outermost knob 30 and medial knob may comprise a single beveled mound 118 or a pair of beveled mounds 122, or simply knob sets 122. In the preferred embodiment, each knob set 122 comprises an axially shorter mound 120-1 and an axially longer mound 120-2 attached side-by-side such that each mound 120-1, 120-2 extends axially and generally parallel to the other.

The longer knob 120-2 defines a second axial length greater than a first axial length of the shorter knob 120-1. The shorter knob 120-1 comprises a first leading edge bevel 130-1, a first contact surface 132-1 and a trailing edge 134-1. The longer knob 120-2 comprises a second leading edge bevel 130-2 positioned ahead, or in front, of the first leading edge bevel 130-1 such that the longer leading edge bevel 130-2 would engage the ground surface prior to the shorter leading edge bevel 130-1. A second outermost surface 132-2 of the longer knob 20-2 has a greater length than that of the first outermost surface 132-1. In the preferred embodiment, the first outermost surface 132-1 and the second outermost surface 132-2 are preferably elongate in the axial direction. In the preferred embodiment, a single transverse trailing edge 134 is provided for the knob set 122. Therefore, the knobs 120-1, 120-2 in each pair 122 can terminate at the same or different locations.

A step, or ramp, 138, shown also in FIG. 1, connects and transitions the first leading edge bevel 130-1 to the second leading edge bevel 130-2. In the preferred embodiment, the ramp 138 comprises surface that begins from a medial linear edge of the longer leading edge bevel 130-2 and curves continuously and rearwardly into the first leading edge bevel 130-1. The ramp 138 may comprise a curved, concave surface or a variety of other surfaces and contours so as to connect the leading edge bevels.

It will be appreciated that each dual-mound knob 122 shares a common base 145 that is integral to both the shorter knob 120-1 and longer knob 120-2. The base 145 comprises that portion of the knob set 122 that attaches to the non-treaded base of the tire 10. Employing a single integral base 145 for each knob set 122 results in a larger footprint with a stronger foundation than those of conventional detached knobs where each conventional knob would have its own separate and smaller base.

Each knob set 122 includes a radially inward channel, or indentation, 143 formed in between the shorter knob 120-1 and the longer knob 120-2 so as to divide said outermost surfaces 132-1, 132-2, splitting what would otherwise be a single outermost surface into a pair of outermost surfaces 132-1, 132-2. The length of the axially elongate channel 143 may be longer or shorter than the lengths of the outermost surfaces 132-1, 132-2.

Therefore, each knob set 122 comprises a pair of juxtaposed elongate knobs 120-1, 120-2 with offset leading edge bevels 130-1, 130-2, connected by a ramp 138, a pair of outermost surfaces 132-1, 132-2 which may or may not be parallel, and a common base 145.

While the preferred knob set 122 in the first preferred embodiment of a tire 10 has been heretofore described as a pair of attached knobs 120, one shorter 120-1 and the other longer 120-2, the preferred knob set 122 may be alternatively described as a single dual-mound knob structure 122 having offset leading edge bevels, namely a first forward leading edge bevel 130-2 and a first recessed leading edge bevel 130-1 connected by a ramp 138. The single knob structure 122 comprises a pair of outermost surfaces 132-1, 132-2 divided by an axial channel 143. The knob structure further comprises a medial sidewall 147, a lateral sidewall 149 and a trailing edge 134.

In contrast to a conventional knob which would consist of only a single leading edge bevel and a single outermost surface, the preferred knob structure 122 according to the first preferred embodiment comprises a pair of offset leading edge bevels 130-1, 130-2 connected by a ramp 138, thereby providing a total of three leading edge surfaces 30-1, 30-2, 38 for each knob structure 122. Furthermore, the preferred knob structure 122 comprises a pair of outermost surfaces 132-1, 132-2 created by indented divider 143. These above features facilitate an improved grip without causing excess resistance.

In FIG. 4, the array of medial knobs 32 may preferably comprise an alternating pattern of single mound knobs and dual-mound knobs. The array of lateral-most knobs 30 may comprise dual-mound knobs. It is to be expressly understood that the sequence of single mound and dual-mound knobs in an array may be arranged in any particular pattern. As shown more prominently in FIG. 1, the patterns of single mound and dual-mound medial knobs 32 may be symmetrically arranged such that the sequence of single mound and dual mound medial knobs in the left zone array matches the sequence in the right zone medial array. Alternatively, the pattern of knobs in one side zone may be asymmetrical with respect to the pattern in the other side zone.

Figure 5:
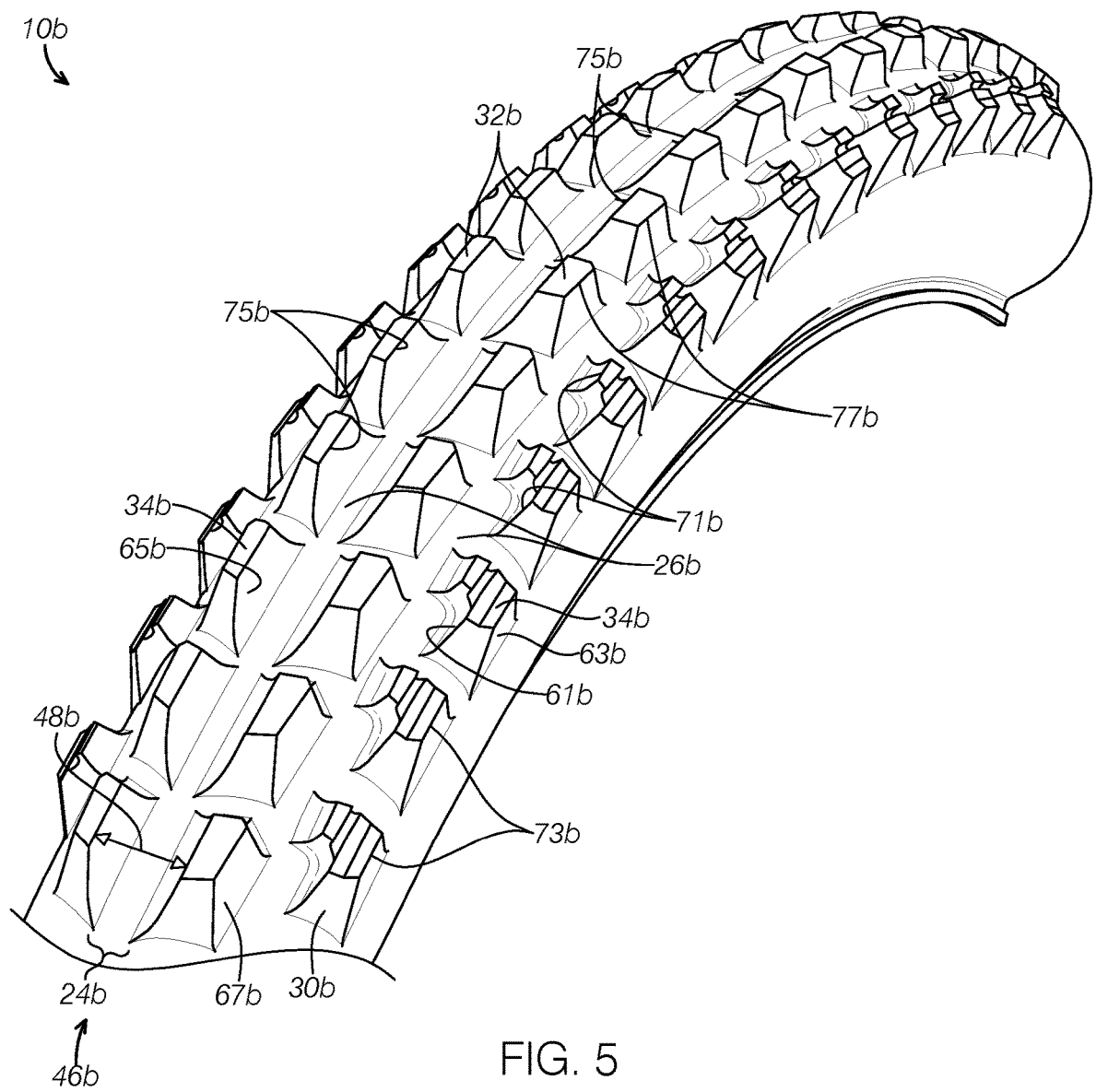
FIG. 5 is a top perspective view of a section of a second preferred embodiment of the tire.
Figure 6:
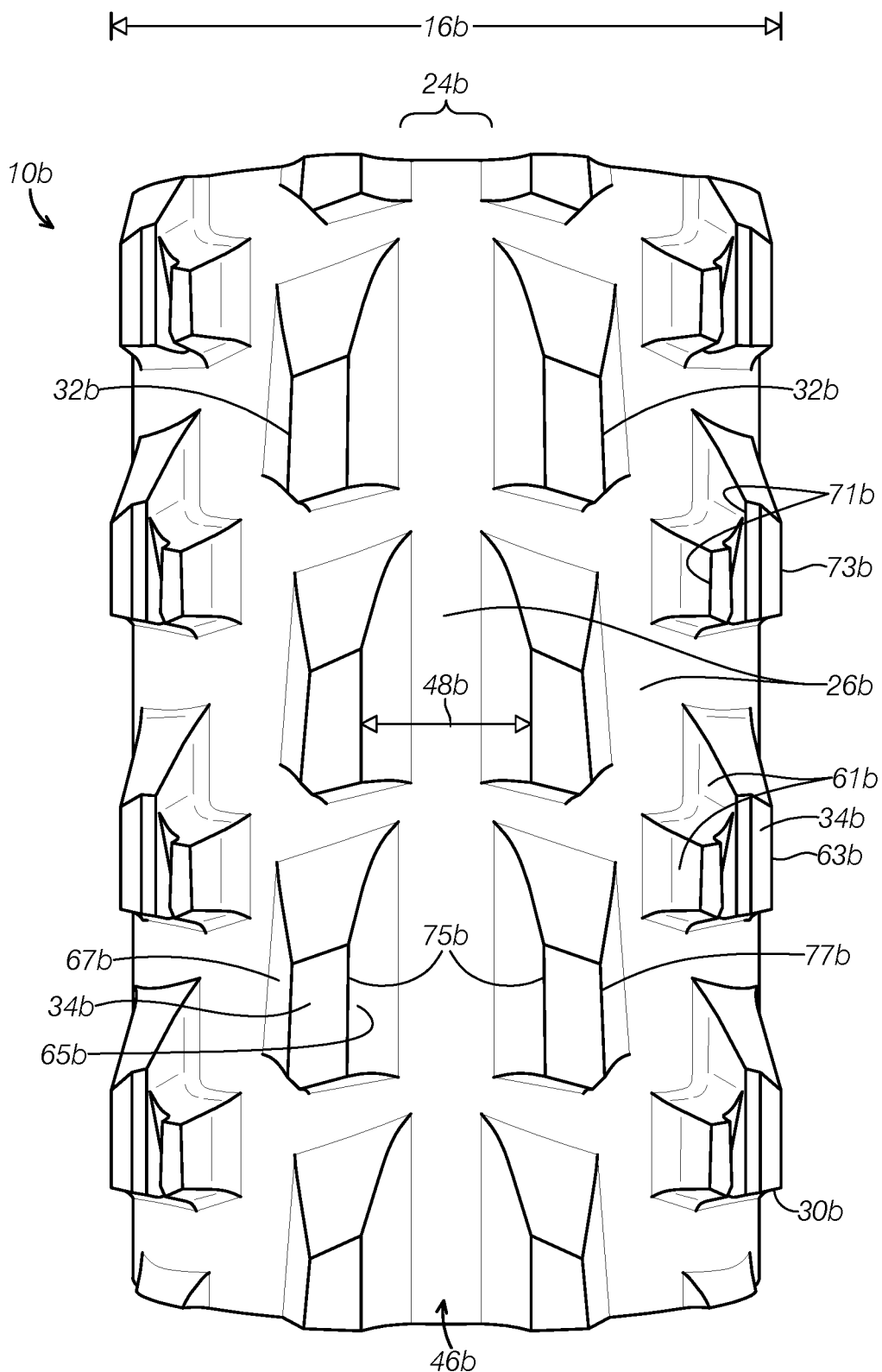
FIG. 6 is a top plan view of a section of the second preferred embodiment of the tire.
Figure 7:
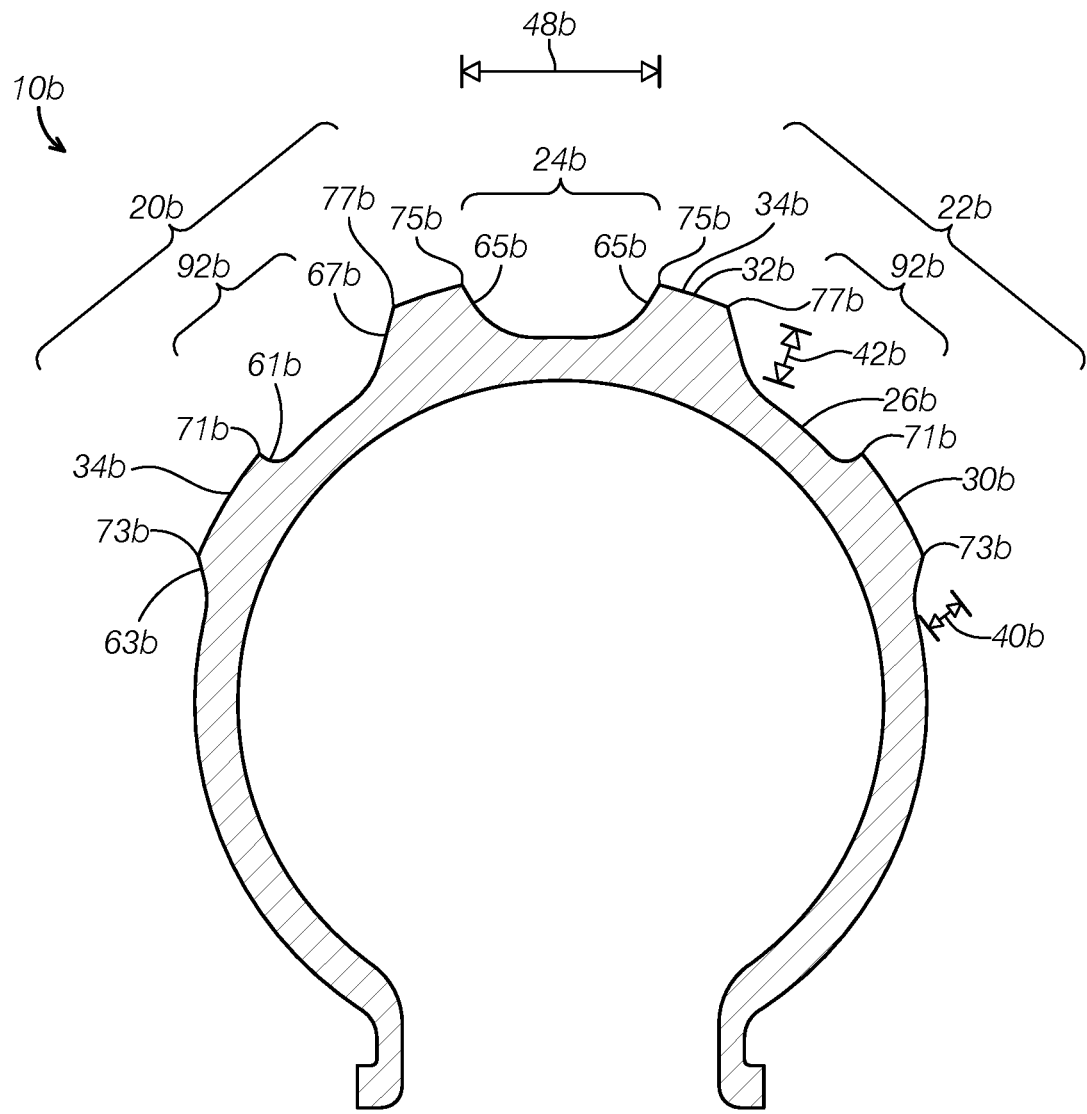
FIG. 7 is a cross-sectional view of the second preferred embodiment of the tire.

FIGS. 5-7 show a second preferred embodiment of a tire 10b where elements of similar structure are designated by the same reference numerals followed by the lower case "b." In the second preferred embodiment shown in FIGS. 5-7, the central zone 24b is substantially devoid of any knob contact surfaces in contrast to the first preferred embodiment 10 of FIGS. 1-4 where small segments or portions of contact surfaces of medial knobs 32b may be disposed within the central zone 24.

The result, as shown more prominently in FIG. 6, is a wider central gap 46b that is accomplished in part by preferably disposing only single-mound knobs 32b in the medial arrays as opposed to dual-mound knobs in the first preferred embodiment. In the second preferred embodiment, the central gap 46b comprises a gap width 48b that is preferably in the range of 15% to 65% of the tire width 16b, and preferably in the range of 9 mm to 30 mm.

In this second embodiment, the arrays of medial knobs 32b comprise single mound knobs while the arrays of lateral-most knobs 30b comprise dual mound knobs. This is in contrast to the axially alternating pattern of single mound and dual mound knobs formed in the first preferred embodiment.

In FIG. 7, the medial knobs 32b may have a medial knob height 42b while the lateral-most knobs 30b may have a lateral knob height 40b. In the second preferred embodiment, the lateral knob height 40b is in the preferred range of 100% to 150% of the medial knob height 42b.

Forming the central zone 24b with either shorter knobs or no knobs facilitates the gripping action of the inside edges of such medial knobs 32b upon the ground when a rider leans into a turn.

Each knob 30b, 32b preferably has a pair of medially facing and laterally facing surfaces that radiate outwardly from the untreaded base 26b of the tire 10b and terminate at the contact surface 34b. In particular, each lateral-most knob 30b preferably has a medially facing surface, or inside wall surface, 61b and a laterally facing surface, or outside wall surface, or 63b. Each lateral-most knob 30b comprises a medial edge, or inside edge, 71b where the medially facing surface 61b meets the contact surface 34b. Each lateral-most knob 30b also comprises a lateral edge, or outside edge, 73b where the laterally facing surface 63b meets the contact surface 34b. Accordingly, each array of lateral-most knobs 30b comprises an array of medial edges 71b that collectively form a dashed line extending around the circumference of the tire 10b near the left side 12b or right side 14b.

Each medial knob 32b preferably comprises a medially facing surface, or inside wall surface, 65b and a laterally facing surface, or outside wall surface, or 67b. Each medial knob 32b comprises a medial edge, or inside edge, 75b where the medially facing surface 65b meets the contact surface 34b. Each medial knob 32b also comprises a lateral edge, or outside edge, 77b where the laterally facing surface 67b meets the contact surface 34b. Accordingly, each array of medial knobs 32b comprises an array of medial edges 75b that collectively form a dashed line extending around the circumference of the tire 10b near the central zone 24b.

When a rider leans into a turn, the medial edges of knobs generally play a more significant factor in providing traction. Therefore, it will be appreciated that the transverse spacing provided in the central zone 24b between the two arrays of medial knobs 32b—i.e., the central gap 46b—enables the medial edges 75b of the medial knobs 32b to grip the ground more effectively than conventional treads which contain central knobs and lack transverse spacing between such centrally knobs.

Accordingly, each array of medial knobs 32b, therefore, comprises an array of medial edges 75b, also creating the aggregate effect of a dashed line of medial edges 75b near the central zone 24b which grip the ground earlier in the leaning of the rider (i.e., lesser lean angle).

In FIG. 7, the preferred tire 10b also comprises two lateral gaps 92b, each lateral gap 92b extending circumferentially in a particular side zone 20b, 22b. A first lateral gap 92b extends circumferentially between the array of medial knobs 32b and the array of lateral-most knobs 30b in the left zone 20b. A second lateral gap 92b extends circumferentially between the array of medial knobs 30b and the array of lateral-most knobs 32b in the right zone 22b. In the preferred embodiment, the lateral gap 92b may have a lateral gap width in the range of 10% to 40% of the tire width. As an example and not by way of limitation, the lateral gap width may preferably be in the range of 7 mm to 25 mm.

Therefore, at least three circumferential gaps are provided in the first preferred embodiment:
4) a central gap 46b between two arrays of medial knobs 32b;
5) a first lateral gap 92b between an array of medial knobs 32b and an adjacent array of lateral-most knobs 30b in one side zone; and
6) a second lateral gap 92b between an array of medial knobs 32b and an adjacent array of lateral-most knobs 30b in other side zone.

Figure 8:
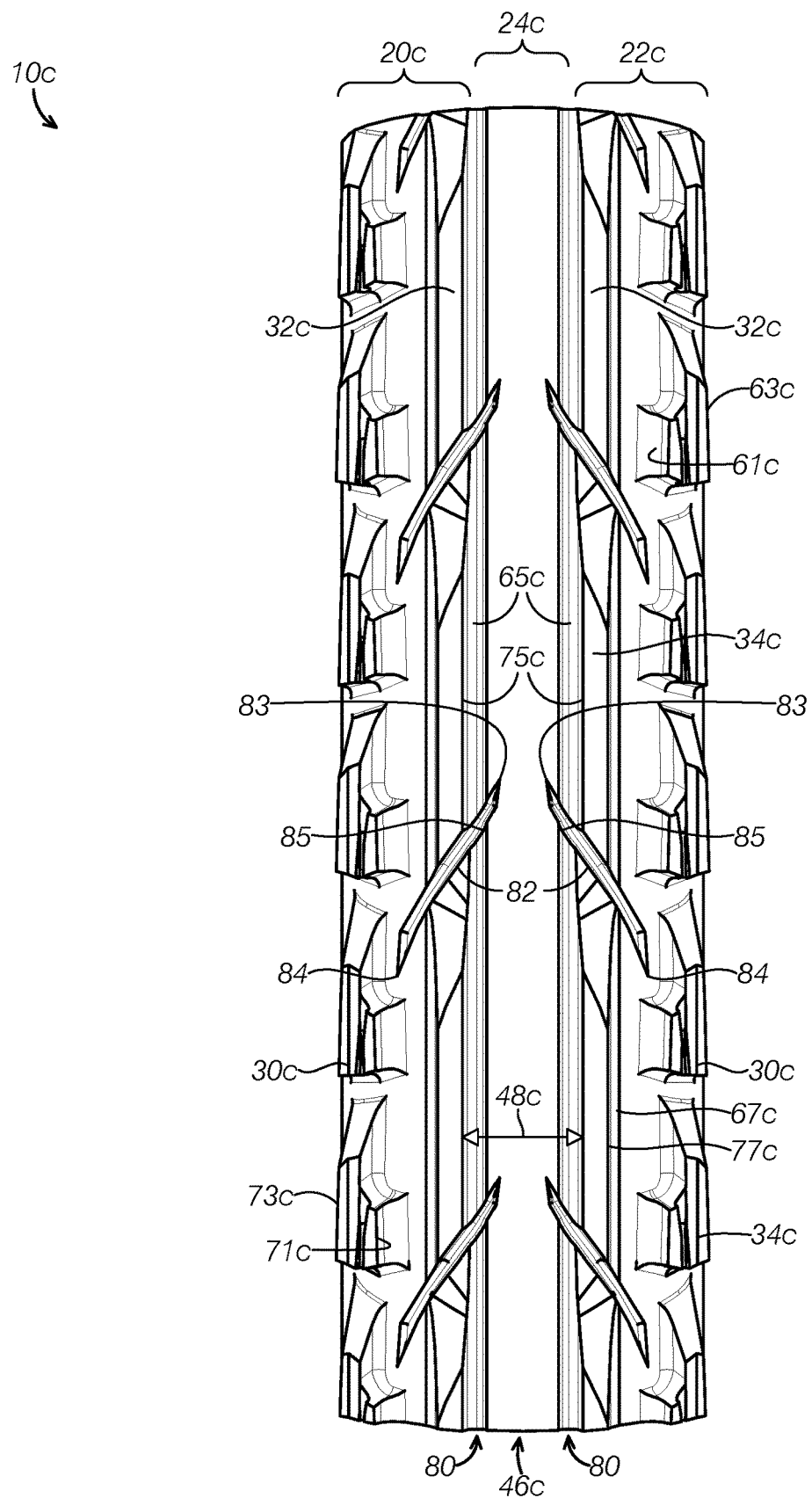
FIG. 8 is a top plan view of a section of a third preferred embodiment of the tire.
Figure 9:
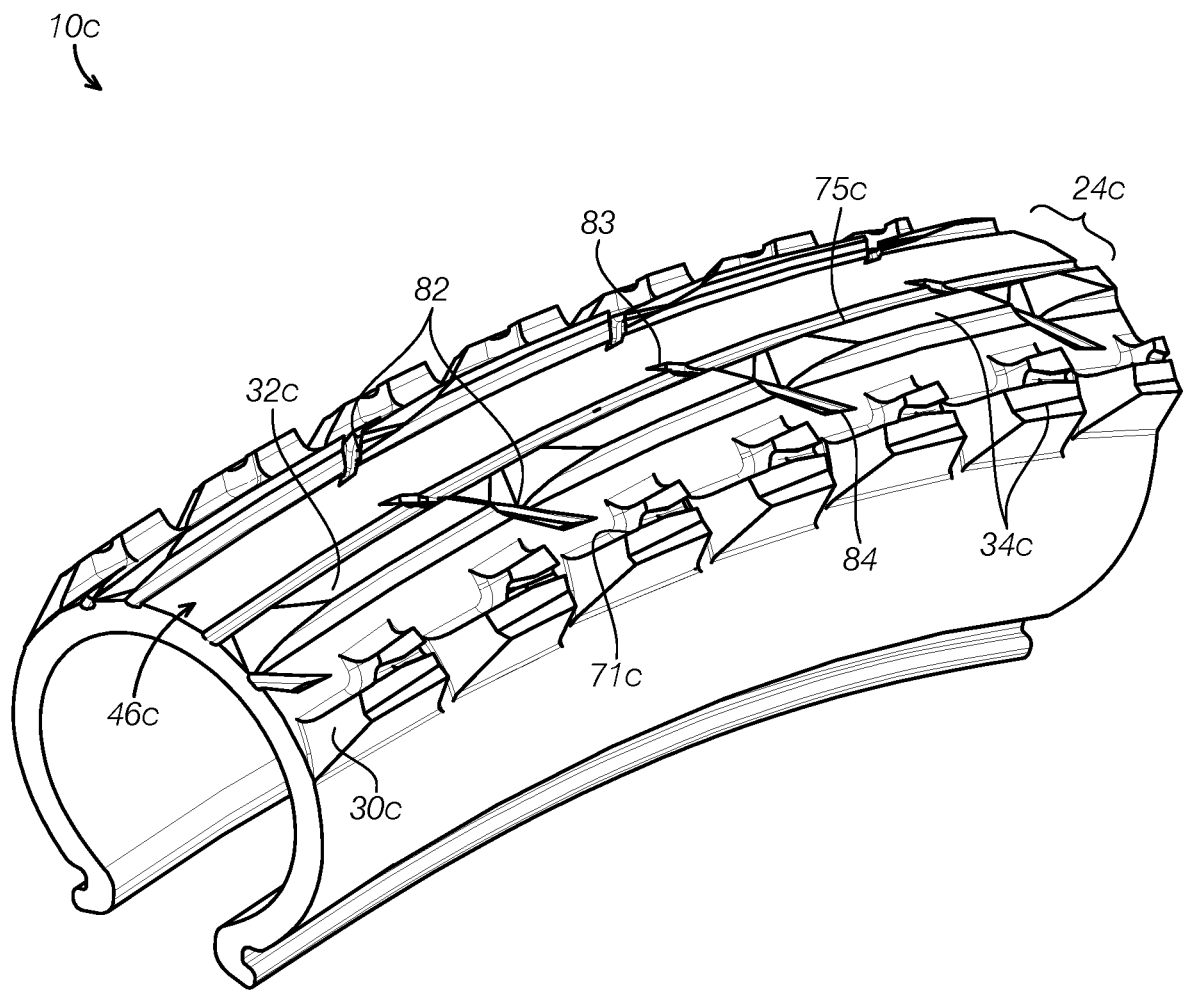
FIG. 9 is a cutaway perspective view of a section of the third preferred embodiment of the tire.
Figure 10:
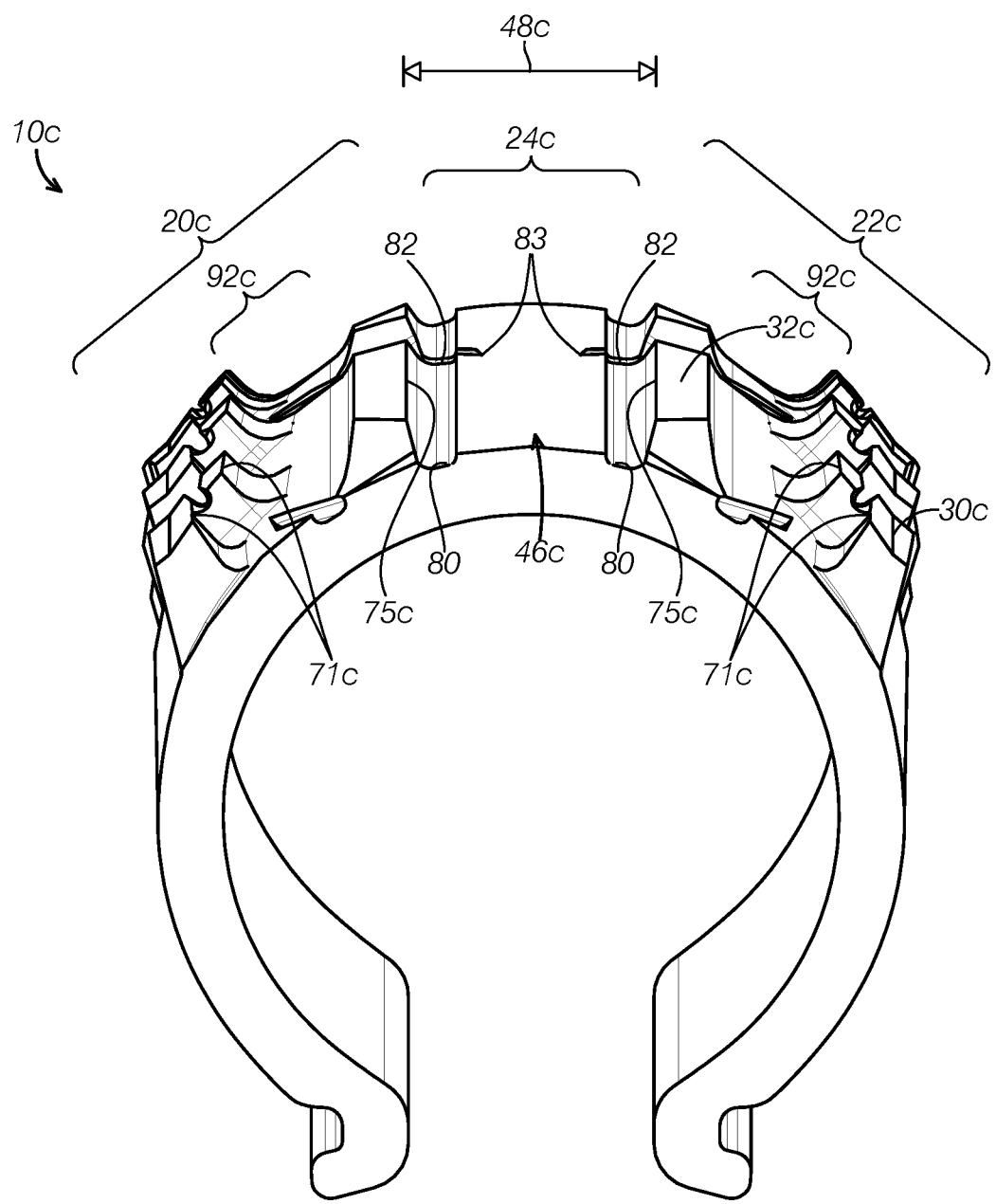
FIG. 10 is a cutaway front elevation view of the third preferred embodiment of the tire.

FIGS. 8-10 show a third preferred embodiment of a tire 10c where elements of similar structure are designated by the same reference numerals followed by the lower case "c."

In the third preferred embodiment shown in FIGS. 8 and 9, the central zone 24c is flanked by a pair of axial channels 80 that extend around the circumference of the tire 10c. Thus, the pair of channels 80 serves as the lateral borders of a central gap 46c that is substantially devoid of knobs. In the preferred embodiment, the channels 80 preferably have a depth of 5% to 30% with respect to the central gap 46c.

Symmetrical pairs of diagonal grooves, or diagonal channels, 82 are interspersed around the circumference of the tire 10c. Each diagonal groove 82 comprises a front end 83 preferably located in the central zone 24c and a rear end 84 located in a side zone 20c, 22c. Thus, the symmetrical grooves 82 diverge as they extend rearwardly. Alternatively stated, each groove 82 converges toward the central gap 46c and preferably intersects the axial channel 80 at a point of intersection 85 as the groove 82 extends forwardly, with the front end 83 preferably positioned in the central zone 24c.

In the third preferred embodiment 10c, each medial knob 32c comprises an elongate single mound beveled knob. Thus, the third preferred tire 10c comprises a first array of elongate medial knobs 32c in the left zone 20c and a second array of elongate medial knobs 32c in the right zone 22c. Each medial knob 32c is separated from an axially adjacent medial knobs 32c by adjacent diagonal channels 82. In the preferred embodiment, each medial knob 32c has an axial length in the range of 10 mm to 70 mm.

Forming the central zone 24c with either shorter knobs or no knobs facilitates the gripping action of the inside edges of such medial knobs 32c upon the ground when a rider leans into a turn.

Each knob 30c, 32c preferably has a pair of medially facing and laterally facing surfaces that radiate outwardly from the untreaded base 26c of the tire 10c and terminate at the contact surface 34c. In particular, each lateral-most knob 30c preferably has a medially facing surface, or inside wall surface, 61c and a laterally facing surface, or outside wall surface, or 63c. Each lateral-most knob 30c comprises a medial edge, or inside edge, 71c where the medially facing surface 61c meets the contact surface 34c. Each lateral-most knob 30c also comprises a lateral edge, or outside edge, 73c where the laterally facing surface 63c meets the contact surface 34c. Accordingly, each array of lateral-most knobs 30c comprises an array of medial edges 71c that collectively form a dashed line extending around the circumference of the tire 10c near the left side 12c or right side 14c.

Each medial knob 32c preferably comprises a medially facing surface, or inside wall surface, 65c and a laterally facing surface, or outside wall surface, or 67c. Each medial knob 32c comprises a medial edge, or inside edge, 75c where the medially facing surface 65c meets the contact surface 34c. Each medial knob 32c also comprises a lateral edge, or outside edge, 77c where the laterally facing surface 67c meets the contact surface 34b. Accordingly, each array of medial knobs 32c comprises an array of medial edges 75c that collectively form a dashed line extending around the circumference of the tire 10c near the central zone 24c.

When a rider leans into a turn, the medial edges of knobs generally play a more significant factor in providing traction. Therefore, it will be appreciated that the transverse spacing provided in the central zone 24c between the two arrays of medial knobs 32c—i.e., the central gap 46c—enables the medial edges 75c of the medial knobs 32c to grip the ground more effectively than conventional treads which contain central knobs and lack transverse spacing between such centrally knobs.

Accordingly, each array of medial knobs 32c, therefore, comprises an array of medial edges 75c, also creating the aggregate effect of a dashed line of medial edges 75b near the central zone 24c which grip the ground earlier in the leaning of the rider (i.e., lesser lean angle).

In FIG. 10, the preferred tire 10c also comprises two lateral gaps 92c, each lateral gap 92c extending circumferentially in a particular side zone 20c, 22c. A first lateral gap 92c extends circumferentially between the array of medial knobs 32c and the array of lateral-most knobs 30c in the left zone 20c. A second lateral gap 92c extends circumferentially between the array of medial knobs 30c and the array of lateral-most knobs 32c in the right zone 22c. In the preferred embodiment, the lateral gap 92c may have a lateral gap width in the range of 10% to 40% of the tire width. As an example and not by way of limitation, the lateral gap width may preferably be in the range of 5 mm to 15 mm.

Therefore, at least three circumferential gaps are provided in the first preferred embodiment:
1) a central gap 46c between two arrays of medial knobs 32c;
2) a first lateral gap 92c between an array of medial knobs 32c and an adjacent array of lateral-most knobs 30c in one side zone; and
3) a second lateral gap 92c between an array of medial knobs 32c and an adjacent array of lateral-most knobs 30c in other side zone.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:
1. A tire having a circumference and a tire width, comprising:
   a left zone comprising a first array of medial knobs, the first array of medial knobs comprising a first plurality of medial edges;
   a right zone comprising a second array of medial knobs, the second array of medial knobs comprising a second plurality of medial edges; and
   a central zone centrally located between the left zone and the right zone, the central zone having a central zone width in the range of 15% to 65% of the tire width, the central zone having a central gap extending around the circumference of the tire without any knob contact surfaces, wherein
   each knob of the first array of medial knobs and each knob in the second array of medial knobs includes a pair of knob mounds comprising a circumferentially shorter mound and a circumferentially longer mound attached side-by-side and a forward-facing surface extending from a contact surface of each of the knobs to a base thereof, the circumferentially shorter mound has a first distinct contact surface that is smaller than a second distinct contact surface of the circumferentially longer mound, the circumferentially shorter mound positioned closer to the central zone than the circumferentially longer mound, and the first distinct contact surface is separated from the second distinct contact surface by a circumferentially oriented recess.

2. The tire of claim 1, wherein:
the central gap has a central gap width between 15% to 65% of the tire width.

3. The tire of claim 1, wherein the first array of medial knobs and the second array of medial knobs comprise a medial knob height that is at least 3% of the tire width.

4. The tire of claim 1, wherein:
the first array of medial knobs comprises a first plurality of contact surfaces, wherein sections of the first plurality of contact surfaces are disposed in the central zone;
the second array of medial knobs comprises a second plurality of contact surfaces, wherein sections of the second plurality of contact surfaces are disposed in the central zone;
the sections of the first plurality of contact surfaces and the sections of the second plurality of contact surfaces amount to less than 20% of a total surface area of the central zone.

5. The tire of claim 1, wherein:
the first array of medial knobs comprises a first plurality of contact surfaces;
the first plurality of contact surfaces defines a first aggregate length that is at least 25% of the circumference; and
the second array of medial knobs comprises a second plurality of contact surfaces; and
the second plurality of contact surfaces defines a second aggregate length that is at least 25% of the circumference.

6. A tire having a circumference and a tire width, comprising:
a left side;
a right side;
a central zone evenly located in between the left side and the right side;
a first array of medial knobs in between the central zone and the left side;
a second array of medial knobs in between the central zone and the right side;
a first array of lateral-most knobs in between the first array of medial knobs and the left side; and
a second array of lateral-most knobs in between the second array of medial knobs and the right side,
wherein the central zone comprises a central gap that extends substantially around the circumference; and
wherein each knob of the first array of lateral-most knobs and each knob of the second array of lateral-most knobs includes a pair of knob mounds comprising a circumferentially shorter mound and a circumferentially longer mound attached side-by-side and a forward-facing surface extending from a contact surface of each of the knobs to a base thereof, the circumferentially shorter mound has a first distinct contact surface that is smaller than a second distinct contact surface of the circumferentially longer mound, the circumferentially shorter mound positioned closer to the central zone than the circumferentially longer mound, and the first distinct contact surface is separated from the second distinct contact surface by a circumferentially oriented recess.

7. The tire of claim 6, wherein the central zone has a central zone width that is between 15% to 65% of the tire width.

8. The tire of claim 6, wherein the central gap has a central gap width between 15% to 65% of the tire width.

9. The tire of claim 6, wherein the central gap is devoid of any knob contact surfaces.

10. The tire of claim 6, wherein:
a first plurality of medial knobs in the first array comprises a first plurality of medial edges that connect a first plurality of medially facing surfaces to a first plurality of contact surfaces;
a second plurality of medial knobs in the second array comprises a second plurality of medial edges that connect a second plurality of medially facing surfaces to a second plurality of contact surfaces; and
the central gap width between the first plurality of medial edges and the second plurality of medial edges is in the range of 9 mm to 30 mm.

11. The tire of claim 6, wherein the first array of medial knobs and the second array of medial knobs comprise a medial knob height that is at least 3% of the tire width.

12. The tire of claim 6, wherein the first array of lateral-most knobs and the second array of lateral-most knobs comprise a lateral-most knob height.

13. The tire of claim 12, wherein:
the first array of medial knobs and the second array of medial knobs comprise a medial knob height that is at least 20% of the lateral-most knob height.

14. The tire of claim 12, further comprising:
a first lateral gap between the first array of medial knobs and the first array of lateral-most knobs, the first lateral gap having a first lateral gap width; and
a second lateral gap between the second array of medial knobs and the second array of lateral-most knobs, the second lateral gap having a second lateral gap width,
wherein the central gap has a central gap width that is greater than the first lateral gap width and the second lateral gap width.

15. The tire of claim 6, wherein:
the first array of medial knobs comprises a first plurality of contact surfaces, wherein sections of the first plurality of contact surfaces are disposed in the central zone;
the second array of medial knobs comprises a second plurality of contact surfaces, wherein sections of the second plurality of contact surfaces are disposed in the central zone;
the sections of the first plurality of contact surfaces and the sections of the second plurality of contact surfaces amount to less than 20% of a total surface area of the central zone.

16. The tire of claim 6, wherein:
the first array of medial knobs comprises a first plurality of contact surfaces;
the first plurality of contact surfaces defines a first aggregate length that is at least 25% of the circumference;
the second array of medial knobs comprises a second plurality of contact surfaces; and
the second plurality of contact surfaces defines a second aggregate length that is at least 25% of the circumference.

17. A tire having a circumference and a tire width, comprising:
a left zone comprising a first array of medial knobs;
a right zone comprising a second array of medial knobs; and
a central zone centrally located between the left zone and the right zone, the central zone having a central zone width in the range of 15% to 65% of the tire width, the central zone comprising a central gap extending substantially around the circumference, the central gap lacking any knob contact surfaces, wherein an interior side wall of each knob of the first and second arrays of medial knobs extending from an inside contact surface thereof toward a base surface of the tire at a first angle relative to the inside contact surface, the interior side wall of the first and second arrays of medial knobs facing toward the central gap; and an exterior side wall, opposite the interior side wall, of each knob of the first and second arrays of medial knobs extending from an outside contact surface thereof toward a base surface of the tire at a second angle relative to the outside contact surface, the first angle being less than the second angle, wherein each knob of the first array of medial knobs and each knob of the second array of medial knobs includes a pair of knob mounds comprising a circumferentially shorter mound and a circumferentially longer mound attached side-by-side and a forward-facing surface extending from a contact surface of each of the knobs to a base thereof, the circumferentially shorter mound has a first distinct contact surface that is smaller than a second distinct contact surface of the circumferentially longer mound, the circumferentially shorter mound positioned closer to the central zone than the circumferentially longer mound, and the first distinct contact surface is separated from the second distinct contact surface by a circumferentially oriented recess.

18. The tire of claim 17, wherein:
the central gap has a central gap width between 15% to 65% of the tire width.

19. The tire of claim 17, wherein:
a first plurality of medial knobs in the first array comprises a first plurality of medial edges that connect a first plurality of medially facing surfaces to a first plurality of contact surfaces;
a second plurality of medial knobs in the second array comprises a second plurality of medial edges that connect a second plurality of medially facing surfaces to a second plurality of contact surfaces; and
the central gap width between the first plurality of medial edges and the second plurality of medial edges is in the range of 9 mm to 30 mm.

20. The tire of claim 17, wherein the first array of medial knobs and the second array of medial knobs comprise a medial knob height that is at least 3% of the tire width.

21. The tire of claim 17, further comprising:
a first array of lateral-most knobs in between the first array of medial knobs and a the left side; and
a second array of lateral-most knobs in between the second array of medial knobs and a the right side,
wherein the first array of lateral-most knobs and the second array of lateral-most knobs comprise a lateral-most knob height.

22. The tire of claim 21, wherein:
the first array of medial knobs and the second array of medial knobs comprise a medial knob height that is at least 20% of the lateral-most knob height.

23. The tire of claim 22, further comprising:
a first lateral gap between the first array of medial knobs and the first array of lateral-most knobs, the first lateral gap having a first lateral gap width; and
a second lateral gap between the second array of medial knobs and the second array of lateral-most knobs, the second lateral gap having a second lateral gap width,
wherein the central gap has a central gap width that is greater than the first lateral gap width and the second lateral gap width.

24. The tire of claim 17, wherein:
the first array of medial knobs comprises a first array of medial edges;
the second array of medial knobs comprises a second array of medial edges;
the central gap lies between first array of medial edges and the second array of medial edges.

25. The tire of claim 17, wherein:
the first array of medial knobs comprises a first plurality of contact surfaces, wherein sections of the first plurality of contact surfaces are disposed in the central zone;
the second array of medial knobs comprises a second plurality of contact surfaces, wherein sections of the second plurality of contact surfaces are disposed in the central zone;
the sections of the first plurality of contact surfaces and the sections of the second plurality of contact surfaces amount to less than 20% of a total surface area of the central zone.

26. The tire of claim 17, wherein:
the first array of medial knobs comprises a first plurality of contact surfaces;
the first plurality of contact surfaces defines a first aggregate length that is at least 25% of the circumference; and
the second array of medial knobs comprises a second plurality of contact surfaces; and
the second plurality of contact surfaces defines a second aggregate length that is at least 25% of the circumference.

* * * * *